United States Patent

Greiner et al.

(10) Patent No.: US 6,762,219 B2
(45) Date of Patent: Jul. 13, 2004

(54) GLASS/PLASTIC COMPOUNDS

(75) Inventors: Robert Greiner, Baiersdorf (DE); Heinrich Kapitza, Fuerth (DE); Manfred Ochsenkuehn, Berg (DE); Angelo Polese, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/149,910

(22) PCT Filed: Dec. 13, 2000

(86) PCT No.: PCT/DE00/04432

§ 371 (c)(1), (2), (4) Date: Oct. 21, 2002

(87) PCT Pub. No.: WO01/44360

PCT Pub. Date: Jun. 21, 2001

(65) Prior Publication Data

US 2003/0129413 A1 Jul. 10, 2003

(30) Foreign Application Priority Data

Dec. 15, 1999 (DE) .......................... 199 60 548

(51) Int. Cl.[7] .............................. C08K 7/20; C08K 3/40
(52) U.S. Cl. .................... 523/223; 524/403; 524/414
(58) Field of Search .................. 523/223; 524/403, 524/414; 501/42, 43, 44, 45, 46, 47, 48

(56) References Cited

U.S. PATENT DOCUMENTS

| 3,732,181 A | * | 5/1973 | Ray et al. ................. 523/207 |
| 4,285,730 A | * | 8/1981 | Sanford et al. ............ 501/44 |
| 5,043,369 A | * | 8/1991 | Bahn et al. ............... 523/466 |
| 5,507,990 A | * | 4/1996 | Bookbinder et al. ........ 264/143 |
| 6,103,810 A | * | 8/2000 | Frayer et al. ............ 524/494 |

FOREIGN PATENT DOCUMENTS

| EP | 0 365 236 A | 4/1990 |
| EP | 0 587 082 A1 | 3/1994 |
| EP | 0 587 083 A1 | 3/1994 |
| EP | 0 773 196 A | 5/1997 |

OTHER PUBLICATIONS

PAJ translation of JP10–101364 (Apr. 21, 1998), Usui Hiroshi et al.*

George H. Beall, "Low Temperature Glasses for Polymer Melt Blends," *Proceedings of the XVII International Congress on Glass*, 1995, Beijing, China, pp. 174–183.

* cited by examiner

*Primary Examiner*—Matthew A. Thexton
(74) *Attorney, Agent, or Firm*—Young & Thompson

(57) ABSTRACT

A glass/plastic compound based on thermoplastics includes a low-melting sulphosphate glass with the following composition: between 4 and 10% $Li_2O$, between 4 and 10% $Na_2O$, between 4 and 8% $K_2O$, between 1 and 2% CaO, between 35 and 37% ZnO, between 0 and 3% $La_2O_3$, between 19 and 22% $P_2O_5$ and between 19 and 22% $SO_3$, in addition to a high-performance thermoplastic.

7 Claims, No Drawings

GLASS/PLASTIC COMPOUNDS

BACKGROUND OF THE INVENTION

The invention relates to glass/plastic compounds based on thermoplastics, and also to a process for their preparation.

In electrical engineering and electronics, reinforced plastics materials, especially based on thermoplastics, are used for producing devices or components. The reinforced thermoplastics usually used here are thermoplastic compounds comprising glass fiber. However,—in particular at high filler levels—these materials have disadvantageous processing performance due to poor flowability and high tooling wear. The mechanical properties are moreover frequently anisotropic—due to orientation of the glass fibers during processing. In the case of moving parts produced from materials of this type, operation results in significant formation of crumb, and this impairs function particularly in the case of devices used in electrical engineering. In addition, if the material of glass-fiber-reinforced thermoplastics is recycled, the glass fibers degrade. The consequence of this is significant impairment of mechanical properties of compounds prepared using these glass fibers.

EP 0 365 236 A1 discloses an alloy in the form of a melt mixture made from at least one inorganic glass and/or one glass ceramic, and from at least one organic thermoplastic or thermoset polymer. The glass or glass ceramic content here is from 30 to 90% by volume. The glass component is a phosphate glass, for example one with the following composition (in mol %): from 44 to 58% of $P_2O_5$, from 4 to 10% of $Al_2O_3+B_2O_3$ (with from 0 to 7% of $Al_2O_3$ and from 0 to 10% of $B_2O_3$), from 10 to 45% of $Li_2O+Na_2O$ (with from 0 to 30% of $Li_2O$ and from 10 to 30% of $Na_2O$), from 0 to 20% of $Cu_2O$ and from 10 to 30% of $Li_2O+Cu_2O$. The thermoplastic polymer is one selected from the following group: polyaryl ether ketones, polyphenylene sulfides, polyfluorinated resins, polyetherimides, liquid-crystalline polyesters, polyether sulfones, polytetrafluoroethylenes, polyether ether ketones, polyether ketones, polyethyl terephthalates, polybutyl terephthalates, melamines and polycarbonates. The thermoset polymer may be an epoxy resin, a silicone resin, a polyimide, a phenolformaldehyde resin, or a diallyl phthalate.

To improve the moisture resistance of alloys of the abovementioned type—and corresponding composites—it is known that, besides the matrix material made from thermoplastic or thermoset polymer and the phosphate glass, use may be made of a water-soluble stabilizer component which is a source of metal cations of valency 2+ or higher (see EP 0 587 082 A1 and EP 0 587 083 A1). Metal cations of this type are $Ba^{2+}$, $Mg^{2+}$, $Ca^{2+}$, $Al^{3+}$, $Zn^{2+}$, $Sr^{2+}$, and $Fe^{3+}$. However, the stabilizer component, which is a metal oxide or another metal compound, markedly impairs processing performance at high filler content, i.e. high glass content, by causing a considerable rise in viscosity.

Other known glasses for glass/plastic blends are those with low glass transition temperature, based on alkali metal zinc pyrophosphates and on alkali metal zinc sulfophosphates (see: G. H. Beall in "Proceedings of XVII International Congress on Glass", Peking, China, Oct. 9–14, 1995, pages 174–183). Examples of the composition of the glasses are as follows (in mol %):

pyrophosphate glasses: from 30–40% of $P_2O_5$, from 20 to 55% of ZnO, from 0–4% of $Al_2O_3$ and from 10–30% of $R_2O$, i.e. from 3–12% of $Li_2O$, from 4–18% of $Na_2O_3$, from 0–12% of $K_2O$, and from 0–17% of $Cu_2O$;

sulfophosphate glasses: from 21–33% of $P_2O_5$, from 9–17% of $SO_3$, from 35–51% of ZnO, and from 10–20% of $R_2O$, where $R_2O$ is mixed alkali.

These glasses are used together with the following thermoplastic polymers: polyether ketones, aromatic liquid-crystalline polyesters, polyaryl sulfones, perfluoroalkoxy resins, and polyetherimides.

Glass/plastic compounds, in particular those based on thermoplastics and used to produce glass-reinforced plastics parts or glass-reinforced plastics structures, are intended to have a specific property profile. The following applies to the properties of the material or the properties of the plastics parts:

homogeneous filler distribution dimensional stability solder bath resistance (SMD capability)

miniaturizability of the glass structures extending to the $\mu$ range good chemicals resistance, i.e. resistance to water, acids and bases intrinsic flame retardancy good tracking resistance high capability for recycling or reprocessing.

The following processing requirements have to be complied with:

minimum processing temperature (however, processing temperature is inevitably above 260° C. due to the requirement for solder bath resistance)

viscosity of the components plastic, i.e. thermoplastic, and glass, selected to be appropriate to one another (under processing conditions)

good flowability at high filler levels possibility of controlling the glass structures (isotropic or anisotropic)

low tooling wear (due to advantageous abrasive properties).

Another criterion is a low level of crumb formation during operation, i.e. low abrasion, in particular in the case of moving parts. In addition, to permit recycling of material, a demand is that recycling does not damage the reinforcing material, i.e. the glass component. Furthermore, it is intended that the glass/plastic compounds be capable of production with maximum cost-effectiveness and minimum cost.

When glasses are used in electrical engineering or electronics, good moisture resistance is of decisive importance. However, known glasses with low glass transition temperature, i.e. from about 220 to 230° C. are susceptible to hydrolysis and in certain instances water-soluble. Although addition of copper oxide ($Cu_2O$) is claimed in principle to permit production of glasses with greater hydrolysis resistance and a glass transition temperature of from about 230 to 250° C., glasses of this type are still markedly more susceptible to hydrolysis than glasses with high glass transition temperature (see: G. H. Beall, loc. cit.); in addition, industrial production is excessively complicated and excessively expensive. On the other hand, glasses with glass transition temperature $T_g > 300°$ C. cannot be used for the stated purpose. The reason is that the glasses are insufficiently flowable until the temperature is above the glass transition temperature by from 70 to 80° C., and therefore processing with a thermoplastic becomes possible only at temperatures above 370–380° C.

SUMMARY OF THE INVENTION

It is an object of the invention to provide glass/plastic compounds based on thermoplastics, which to a very substantial extent meet the requirements placed on the properties of compounds of this type, and also the demands with regard to processing, operation, and recycling of material. The glass here is in particular intended to have relatively high flowability and hydrolysis resistance, and it is also intended that fine distribution of the glass (<10 $\mu$m) be possible at any desired concentration.

According to the invention, this is achieved by way of glass/plastic compounds which comprise the following components:

a sulfophosphate glass with a low melting point and having the following composition: from 4 to 10% of $Li_2O$, from 4 to 10% of $Na_2O$, from 4 to 8% of $K_2O$, from 1 to 2% of CaO, from 35 to 37% of ZnO, from 0 to 3% of $La_2O_3$, from 19 to 22% of $P_2O_5$, and from 19 to 22% of $SO_3$, and a high-performance thermoplastic.

DESCRIPTION OF THE PREFERRED EMBODIMENTS

A "low-melting" sulfophosphate glass is a glass with low glass transition temperature $T_g$, in particular a glass with $T_g$<about 500° C. A "high-performance thermoplastic" is a high-performance polymer, and specifically in the present case a heat-resistant polymer or high-temperature-resistant polymer. This is important because the temperature during preparation of the compounds is >300° C., as is the processing temperature (for the compounds).

The glass/plastic compounds of the invention or glass/polymer compounds of the invention have good mechanical and thermal properties, and also good processing properties, in particular good flowability, even at high filler content, i.e. high glass content. They also have excellent chemical resistance, in particular to water, acids, and bases, and indeed, surprisingly, without addition of stabilizers. The glass/plastic compounds moreover have excellent abrasion resistance, and recycling of the material is possible without difficulty because there is none of the shortening of the glass component which occurs with glass-fiber-reinforced compounds. In comparison with known compounds or known blends (see: G. H. Beall, loc. cit.), an advantage is that neither SrO nor $Al_2O_3$ is present in the glass component. Specifically, strontium is relatively expensive, and the dissolution of aluminum oxide in the glass on an industrial scale is excessively complicated. In contrast, the compounds of the invention are capable of meeting industrial requirements and can be produced on the ton scale.

The sulfophosphate glasses present in the glass/plastic compounds of the invention have a glass transition temperature of $250 \leq T_g \leq 280°$ C. The composition of the sulfophosphate glass preferably found in the compounds (in mol %) is: 4.9% of $Li_2O$, 9.4% of $Na_2O$, 7.1% of $K_2O$, 1.6% of CaO, 36.6% of ZnO, 20.0% of $P_2O_5$, and 20.4% of $SO_3$. A glass of this type has a glass transition temperature of 268° C. An example of another composition of a glass is as follows (in mol %): 9% of $Li_2O$, 5% of $Na_2O$, 7% of $K_2O$, 1.6% of CaO, 37% of ZnO, 20.4% of $P_2O_5$, and 20% of $SO_3$ ($T_g$=280° C.). An example of a further composition of a glass is as follows (in mol %): 4.8% of $Li_2O$, 9.2% of $Na_2O$, 6.9% of $K_2O$, 1.6% of CaO, 35.9% of ZnO, 2.0% of $La_2O_3$, 19.6% of $P_2O_5$, and 20.0% of $SO_3$ ($T_g$=275° C.)

The high-performance thermoplastic used is advantageously a polyether ether ketone (PEEK), a polyetherimide (PEI), a polyphenylene sulfide (PPS), a partly aromatic polyamide, such as polyphthalamide (PPA), or a liquid-crystalline polymer (LCP). For these polymers, the glass transition temperature of the glass component is compatible with the processing temperature of the thermoplastic material. Other high-performance thermoplastics which may be used as polyaryl ether ketones (PAEK) in general, for example polyether ketones (PEK), and also polysulfones (PSU), in particular polyether sulfones (PES), and polyphenylene sulfones (PPSU).

The glass component content, i.e. sulfophosphate glass, in the glass/plastic compounds is preferably from 15 to 60% by weight. For particular applications, however, the glass content may be up to 80% by weight. The compounds may also comprise conventional additives, such as color pigments and stabilizers. Examples of possible applications are in sensors, actuators, plug connectors, electro-optical components, and relays.

The preparation of the glass/plastic compounds according to the invention begins by preparing a masterbatch with glass content of from 60 to 90% by weight from the two components, i.e. sulfophosphate glass and high-performance thermoplastic—at an elevated temperature.

Surprisingly, it has been found here that the use of glass particles (glass grains) with diameter $\leq 1.5$ mm gives glass structures in the $\mu$m and sub-$\mu$m range uniformly distributed in the masterbatch.

The further processing then uses addition of further high-performance thermoplastic to the masterbatch—at elevated temperature—to reduce glass content to 15–60% by weight. This has no effect on the structure and the homogeneous distribution of the glass particles, i.e. they are retained. Surprisingly, control experiments showed that if a batched material by way of example with glass content of 15% is used directly as starting material, the size of the structures and their distribution are not of the type described. Rather, uniformly distributed glass structures, extending as far as the nm range, can only be produced starting from a masterbatch with high content of the specific sulfophosphate glass in a high-performance thermoplastic.

The glass/plastic compounds of the invention are prepared at elevated temperature, preferably at from about 320 to 420° C. When preparing the compounds it is also possible to adjust the structure of the glass particles (isotropic/anisotropic) by way of the processing conditions. The compounds also have good coupling of the glass components to the thermoplastic material, as shown in particular by the good chemicals resistance.

One of the ways in which the good coupling of the glass component is achieved is that the glass comes into contact with the thermoplastic material in a molten state, and therefore at the juncture of contact has free and active polar end groups on its surface which have not yet been deactivated by hydroxy groups, for example from the water present in air. These reactive end groups interact with the surface of the thermoplastics with which they come into contact, thus bringing about particularly stable coupling of the two materials, glass and thermoplastic, to one another.

Since it is possible to start from relatively coarse particles of a sulfophosphate glass, the particle size being $\leq 4$ mm, preferably $\leq 1.5$ mm, the process of the invention therefore provides the opportunity of low-cost production of glass/plastic compounds in which the glass particles have been uniformly and homogeneously distributed in a high-performance thermoplastic, and moreover are capable of adjustment as desired by extending into the nm range. This is achieved by way of the viscosity of the individual components, and by way of the process conditions, in particular the processing temperature; the viscosity ratio of plastic to glass is generally about 1:1000. Compounds of this type are particularly suitable for producing devices or components for electrical engineering or electronics. Specifically, the substantial requirements in relation to properties of the material and processing properties are fulfilled here, and reliable operation is ensured. The compounds also permit a marked reduction in the variety of materials used in devices and components in electrical engineering and electronics, in particular with respect to plastics, extending as far as use of just one type. This permits low-cost recycling of material, and specifically with retention of the properties of the filler.

Nowadays, components and component parts for the various units use different thermoplastics with a variety of fillers and reinforcing materials, and moreover in different proportions. This may be illustrated in more detail taking the example of what is known as a "slim-line mains relay" (SMR).

In a relay of this type, the actuator is composed of a liquid-crystalline polymer (LCP) with 30% of glass fiber reinforcement, and the base is composed of a polyphthalamide (PPA) with 25% by weight of glass fiber reinforcement and 25% by weight of mineral reinforcement, and the coil former likewise is composed of polyphthalamide, but with 45% by weight of glass fiber reinforcement, and the cap is composed of a polybutylene terephthalate (PBT) with 15% by weight of glass fiber reinforcement. In addition to this, the polyphthalamide for the base and the coil former comprises a halogen-containing flame retardant.

Examples of comparable diversity of materials are also found in sensors, actuators, semiconductor components, and plug connectors. The smallness of the units, together with the diversity of types of materials used and the halogen-based flame retardancy make it almost impossible to recycle components or component parts, and this is also very costly. As stated above, marked shortening of the glass fibers also occurs when glass-fiber-reinforced materials are reclaimed or reprocessed. This has a marked adverse effect on the mechanical and thermal properties of the reused material.

Use of the glass/plastic compounds of the invention, which comprise a low-melting sulfophosphate glass and a high-performance thermoplastic, can solve the problems mentioned. The high-performance thermoplastic here is in particular polyphenylene sulfide (PPS), polyether ether ketone (PEEK), polyetherimide (PEI), polysulfone (PSU), polyether sulfone (PES), or partly aromatic polyamide, such as polyphthalamide (PPA). The glass component is selected to be appropriate for the respective plastic, and has a glass transition temperature in the range from 250 to 280° C. The glass component is flowable at the processing temperature of the compounds, which is from about 320 to 420° C. The content of the glass component in the compound is from 15 to 80% by weight, preferably from 15 to 60% by weight.

Since the glass component is flowable at the processing temperature, the compounds exhibit very good flow behavior—despite the high glass content, and it is possible to produce components with complicated geometry and thin walls. It is also possible to produce desired fiber-shaped or bead-shaped glass structures in the component by way of appropriate selection of the viscosity of thermoplastic and glass, and by way of suitable component design. With this, there is the possibility of providing fiber reinforcement in mechanically stressed zones of a component, while at the same time in zones which have to meet high dimensional stability requirements producing a bead structure which ensures that the material behaves isotropically.

In the case of a slim-line mains relay, all four of the individual components may be manufactured from the same underlying thermoplastic, for example polyphenylene sulfide, with different glass contents which comply with the requirements with respect to mechanical, thermal, and electrical processing properties. It is also significant that these components are flame-retardant without any use of halogens.

Since the glass fibers or glass beads produced during processing are newly melted during any reprocessing, and are therefore regenerated, fibers—unlike conventional glass fibers—cannot become shortened. The reused material therefore has the same mechanical and thermal properties as virgin product. The entire plastics content of the network relay can be reclaimed and recycled simply and at low cost. The recycled material obtained is a compound whose glass content is composed of the glass contents of the individual components. During reclamation it is then easily possible to meter in plastics raw material or low-melting glass in order to set a desired glass content in the recycled material.

The glass/plastic compounds of the invention therefore have excellent suitability for halogen-free flame-retardant components and component parts for electrical engineering and electronics, where these comprise a single type of material and provide high recyclability. The units here use the same underlying thermoplastic for all of the individual component parts, and these can be mixed with various contents of a low-melting glass. The component built up from individual component parts of this type can be recycled simply and at low cost.

The invention will now be further illustrated using examples. The sulfophosphate glass used here has the following composition (in mol %): 4.9% of $Li_2O$, 9.4% of $Na_2O$, 7.1% of $K_2O$, 1.6% of $CaO$, 36.6% of $ZnO$, 20.0% of $P_2O_5$, and 20.4% of $SO_3$.

EXAMPLE 1

Preparation of a Masterbatch

The masterbatch is preferably prepared in a corotating or counter-rotating twin-screw extruder with 11 separate barrel heating zones (barrel zone 1: feed hopper; barrel zone 11: die). The design of the screws is such that there are two or more kneading blocks and shearing blocks, and also melt flow restrictors, incorporated into barrel heating zones 3–5. Zones 6–9 have dispersing elements, and zones 10 and 11 comprise conveying elements.

The plastics used are either in powder form or in pellet form (lenticular pellets or cylindrical pellets of length from 3 to 4 mm and diameter from 2 to 5 mm); the grain size of the glass is ≦1.5 mm. When a pulverulent plastic is used, a dry mix (premix) is first made ready with the corresponding ratio of glass (from 60 to 90%) to plastic from 40 to 10%), and this is then metered into the main feed (feed hopper) of the extruder. When plastics pellets are used, the two components are metered into the feed hopper by way of metering systems as required by their content. This procedure may also be used when pulverulent plastics are used. It is also possible to meter the pulverulent plastic or plastics pellets into the feed hopper of the extruder and to meter the glass by way of ancillary metering in barrel zones 3–5. Prior to processing, both the glass and the plastic or, as appropriate, the dry mix are thoroughly predried for at least 4 h at from 100 to 150° C. The compound is discharged through a pelletizing die, and is cooled in an attached waterbath, and then comminuted in a pelletizer. For very high glass contents it is advisable to use a die-face cutter.

(a) Preparation of a masterbatch based on PPS powder; glass content: 70% by weight

| Barrel temperature profile: | | | | | |
|---|---|---|---|---|---|
| Barrel zones: | 1 | 2 | 3–5 | 6–9 | 10 | 11 |
| | 100 | 300 | 335 | 330 | 330 | 330° C. |
| Screw rotation rate: 65 rpm | | | | | |

With this type of temperature profile, a melt temperature of about 345° C. is measured at the die (barrel zone 11). The size of the glass particles in the masterbatch is less than or equal to 10 μm, and they have homogeneous distribution.

(b) Preparation of a masterbatch based on PEEK powder; glass content: 65% by weight

| Barrel temperature profile: | | | | | |
|---|---|---|---|---|---|
| Barrel zones: | 1 | 2 | 3–5 | 6–9 | 10 | 11 |
| | 100 | 350 | 375 | 370 | 370 | 370° C. |
| Screw rotation rate: 60 rpm | | | | | |

With this type of temperature profile, a melt temperature of about 395° C. is measured at the die (barrel zone 11). The size of the glass particles in the masterbatch is less than or equal to 5 μm, and they have homogeneous distribution.

(c) Preparation of a masterbatch based on PEI pellets; glass content: 60% by weight

| Barrel temperature profile: | | | | | |
|---|---|---|---|---|---|
| Barrel zones: | 1 | 2 | 3–5 | 6–9 | 10 | 11 |
| | 100 | 350 | 385 | 375 | 375 | 375° C. |
| Screw rotation rate: 60 rpm | | | | | |

With this type of temperature profile, the melt temperature measured at the die (barrel zone 11) is about 400° C. The size of the glass particles in the masterbatch is less than or equal to 1 μm and they have homogeneous distribution.

EXAMPLE 2

Reduction of Glass Content in Masterbatch of Example 1

The glass content in the masterbatch is reduced in the twin-screw extruder described (see example 1). The final glass content of from 15 to 60% by weight may be set in two ways:

(i) Masterbatch pellets and base material are weighed out as required by their proportions, corresponding to the final glass content to be set, and made ready in a dry mix. This dry mix is metered into the feed hopper of the extruder. The final compound is therefore prepared in a second extruder pass.

(ii) Preparation takes place together with masterbatch preparation in the same extruder pass, by using a second ancillary metering unit to meter base material—as required by the glass content to be set—in barrel zones 6–9.

Only one extruder pass is therefore required to prepare the final compound.

Version (ii) is preferred here, since the materials are only exposed once to the thermal stress in the preparation process, and excessive molecular degradation of the base material is therefore avoided.

In version (i), the barrel temperature profile in zones 3 to 11 is in each case below the corresponding temperature profile of example 1 by approximately from 15 to 20° C.

(a) Reduction of glass content in masterbatch based on PPS powder with glass content of 70% by weight for preparing a compound with 25% by weight glass content using version (i)

| Barrel temperature profile: | | | | | |
|---|---|---|---|---|---|
| Barrel zones: | 1 | 2 | 3–5 | 6–9 | 10 | 11 |
| | 100 | 300 | 320 | 315 | 315 | 315° C. |
| Screw rotation rate: 63 rpm | | | | | |

With this type of temperature profile, a melt temperature of about 330° C. is measured at the die (barrel zone 11). The size of the glass particles in the compounded material is less than or equal to 10 μm and they have homogeneous distribution.

(b) Reduction of glass content in masterbatch based on PEEK powder with glass content of 65% by weight for preparing a compound with 40% by weight glass content using version (ii)

| Barrel temperature profile: | | | | | |
|---|---|---|---|---|---|
| Barrel zones: | 1 | 2 | 3–5 | 6–9 | 10 | 11 |
| | 100 | 350 | 375 | 370 | 370 | 370° C. |
| Screw rotation rate: 60 rpm | | | | | |

With this type of temperature profile, a melt temperature of about 390° C. is measured at the die (barrel zone 11). The size of the glass particles in the compounded material is less than or equal to $\leq 5$ μm and they have homogeneous distribution.

EXAMPLE 3

Chemicals Resistance (a) Hydrolysis resistance

To test the hydrolysis resistance of the pure glass, the glass is stored for 21 days at room temperature in distilled water, and then the pH is determined using litmus paper. Result: pH=7, i.e. neutral behavior.

The same specimen of glass is then stored for 5 days at 80° C. in distilled water, and the pH is determined by means of litmus paper. Result: pH=7, i.e. neutral behavior.

(b) Chemicals resistance of a compound based on PEEK powder with glass content of 40% by weight Test specimens made from this compound are stored in distilled water, 1% strength HCl, and 1% strength NaOH at room temperature, and the increase or decrease in weight is then measured after various storage times, and the percentage increase or decrease in weight is calculated. The corresponding specimen weight prior to start of storage is used as reference value. The specimens are predried for 4 h at 150° C. before the measurement and storage process begins.

| Medium | Material | 24 h | 100 h | 400 g | 1000 h |
|---|---|---|---|---|---|
| H$_2$O dist. | PEEK | 0.09% | 0.14% | 0.26% | 0.34% |
| | PEEK + 40% glass | 0.03% | 0.12% | 0.34% | 0.56% |

-continued

| Medium | Material | 24 h | 100 h | 400 g | 1000 h |
|---|---|---|---|---|---|
| 1% HCl | PEEK | 0.08% | 0.13% | 0.23% | 0.32% |
| | PEEK + 40% glass | −0.23% | −0.28% | −0.21% | −0.01% |
| 1% NaOH | PEEK | 0.09% | 0.14% | 0.25% | 0.33% |
| | PEEK + 40% glass | −0.16% | −0.16% | −0.03% | 0.14% |

(c) Chemicals resistance of a compound based on PPS powder with glass content of 40% by weight Test specimens made from this compound are stored in distilled water, 1% strength HCl, and 1% strength NaOH at room temperature, and the increase or decrease in weight is then measured after various storage times, and the percentage increase or decrease in weight is calculated. The corresponding specimen weight prior to start of storage is used as reference value. The specimens are predried for 4 h at 150° C. before the measurement and storage process begins.

| Medium | Material | 24 h | 120 h | 456 h | 648 h |
|---|---|---|---|---|---|
| H₂O dist. | PPS | 0.005% | 0.014% | 0.03% | 0.035% |
| | PPS + 40% glass | 0.037% | 0.063% | 0.16% | 0.21% |
| 1% HCl | PPS | 0.009% | 0.014% | 0.028% | 0.030% |
| | PPS + 40% glass | −0.13% | −0.10% | −0.02% | 0.007% |
| 1% NaOH | PPS | 0.005% | 0.014% | 0.030% | 0.033% |
| | PPS + 40% glass | −0.075% | −0.05% | 0.025% | 0.075% |

EXAMPLE 4

Friction and Wear

Frictional performance and wear performance is tested in a pin/disk arrangement.

| Experimental parameters; | |
|---|---|
| Friction disk: | Steel |
| Surface roughness of friction disk: | 0.8 μm |
| Pressure: | 4 N/mm² |
| Frictional velocity: | 0.5 m/s |
| Temperature: | 23° C. |

Wear (in μm) and coefficient of friction are determined on injection-molded test specimens (area 10 mm×4 mm) which had been taken from a dumbbell specimen. The duration of the experiment was 15 h after expiry of the start-up phase. Comparison is made between a compound based on PPS with 40% by weight glass content and a corresponding compound with glass content of 60% by weight, and a commercially available PPS with 40% by weight of glass fibers (PPS Gf 40).

| Material | Wear in 15 h μm | Coefficient of friction |
|---|---|---|
| PPS Gf 40 | 950 | 0.32 |
| PPS + 40% glass | 140 | 0.32 |
| PPS + 60% glass | 20 | 0.30 |

What is claimed is:

1. A glass/plastic compound based on thermoplastics, consisting essentially of:

a sulfophosphate glass with a glass transition temperature $T_g$>about 500° C. and having the following composition in mol %: from 4 to 10% of $Li_2O$, from 4 to 10% of $Na_2O$, from 4 to 8% of $K_2O$, from 1 to 2% of CaO, from 35 to 37% of ZnO, from 0 to 3% of $La_2O_3$, from 19 to 22% of $P_2O_5$, and from 19 to 22% of $SO_3$; and a high-performance thermoplastic selected from the group consisting of a polyether ether ketone (PEEK), a polyetherimide (PEI), a polyphenylene sulfide (PPS), a partly aromatic polyamide, a liquid-crystalline polymer (LCP), a polyaryl ether ketone (PAEK), a polyether ketone, and a polysulfone (PSU).

2. The glass/plastic compound as claimed in claim 1, wherein the sulfophosphate glass has the following composition: 4.9% of $Li_2O$, 9.4% of $Na_2O$, 7.1% of $K_2O$, 1.6% of CaO, 36.6% of ZnO, 20.0% of $P_2O_5$, and 20.4% of $SO_3$.

3. The glass/plastic compound as claimed in claim 1, wherein the high-performance thermoplastic is one of a polyether ether ketone, a polyetherimide, a polyphenylene sulfide, a partly aromatic polyamide, and a liquid-crystalline polymer.

4. The glass/plastic compound as claimed in claim 1, wherein the sulfophosphate glass content is from 15 to 60% by weight.

5. A process for producing glass/plastic compounds, the process comprising the steps of:

preparing a masterbatch with glass content of from 60 to 90% by weight from a sulfophosphate glass and a high-performance thermoplastic at from about 320 to 420° C.; and reducing the glass content to 15–60% by weight by adding further said high-performance thermoplastic at from 320 to 420° C., wherein the sulfophosphate glass has the following composition in mol %: from 4 to 10% of $Li_2O$, from 4 to 10% of $Na_2O$, from 4 to 8% of $K_2O$, from 1 to 2% of CaO, from 35 to 37% of ZnO, from 0 to 3% of $La_2O_3$, from 19 to 22% of $P_2O_5$, and from 19 to 22% of $SO_3$, and wherein the thermoplastic is selected from the group consisting of polyether ether ketone (PEEK), a polyetherimide (PEI), a polyphenylene sulfide (PPS), a partly aromatic polyamide, a liquid-crystalline polymer (LCP), a polyaryl ether ketone (PAEK), a polyether ketone, and a polysulfone (PSU).

6. The process as claimed in claim 5, further comprising the step of adding glass particles with a diameter of ≦1.5 mm.

7. An electrical and/or electronic component that comprises:

a glass/plastic compound with a low-melting sulfophosphate glass of the following composition in mol %: from 4 to 10% of $Li_2O$, from 4 to 10% of $Na_2O$, from 4 to 8% of $K_2O$, from 1 to 2% of CaO, from 35 to 37% of ZnO, from 0 to 3% of $La_2O_3$, from 19 to 22% of $P_2O_5$, and from 19 to 22% of $SO_3$; and a single high-performance thermoplastic.

* * * * *